United States Patent
Kim et al.

(10) Patent No.: US 8,416,208 B2
(45) Date of Patent: Apr. 9, 2013

(54) DISPLAY APPARATUS HAVING TOUCH SCREEN PANEL

(75) Inventors: Woon Chun Kim, Gyunggi-do (KR);
Jong Young Lee, Gyunggi-do (KR);
Yong Soo Oh, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 266 days.

(21) Appl. No.: 12/825,192

(22) Filed: Jun. 28, 2010

(65) Prior Publication Data

US 2011/0254780 A1    Oct. 20, 2011

(30) Foreign Application Priority Data

Apr. 14, 2010 (KR) .................. 10-2010-0034487

(51) Int. Cl.
*G06F 3/041* (2006.01)
(52) U.S. Cl.
USPC ..................... 345/173; 361/679.01
(58) Field of Classification Search .............. 345/1.1, 345/173–175; 361/679.01; 379/428.01
See application file for complete search history.

(56) References Cited

U.S. PATENT DOCUMENTS

| 2008/0273014 A1* | 11/2008 | Lowles et al. ........... 345/173 |
| 2009/0122026 A1* | 5/2009 | Oh .......................... 345/174 |
| 2009/0143142 A1* | 6/2009 | Marcus et al. ........... 463/37 |

FOREIGN PATENT DOCUMENTS

JP    2007-072902    3/2007

OTHER PUBLICATIONS

Office Action from counterpart Korean Patent Application No. 10-2010-0034487, mailed May 31, 2011, 3 pages.

* cited by examiner

*Primary Examiner* — Adam R Giesy
*Assistant Examiner* — Andrew Sasinowski
(74) *Attorney, Agent, or Firm* — Blakely Sokoloff Taylor & Zafman LLP

(57) ABSTRACT

Disclosed herein is a display apparatus having a touch screen panel including: a housing of which first surface is open; a main circuit substrate that is built-in the housing; a display unit that is connected to the main circuit substrate and is disposed to face the opened first surface of the housing; and a touch screen panel that is connected to the main circuit substrate and is positioned on the upper portion of the display unit and includes an active region disposed on the first surface and inactive regions that are extended from the active region and are disposed at side surfaces of the housing or on a second surface opposite to the first surface.

7 Claims, 9 Drawing Sheets

DISPLAY APPARATUS HAVING TOUCH SCREEN PANEL

CROSS REFERENCE TO RELATED APPLICATION

This application claims the benefit of Korean Patent Application No. 10-2010-0034487, filed on Apr. 14, 2010, entitled "Display Apparatus Having Touch Screen Panel", which is hereby incorporated by reference in its entirety into this application.

BACKGROUND OF THE INVENTION

1. Technical Field

The present invention relates to a display apparatus having a touch screen panel.

2. Description of the Related Art

With the development of the mobile communication technology, user terminals such as cellular phones, PDAs, navigations, and computer monitors can serve as a display unit that simply displays character information as well serve as a unit for providing various and complex multi-media such as audio, moving pictures, radio Internet web browser, etc.

In addition, display apparatuses require a larger display screen, such that a display apparatus using a touch screen panel has become the main focus.

Recently, as the touch screen panel, a resistive touch screen panel having a simple structure, a thin thickness, and excellent mass production is prevalently used. The resistive touch screen panel includes an upper electrode plate (an upper substrate having one surface on which a transparent electrode layer is formed), which becomes an operating side, and a lower electrode plate (a lower substrate having one surface on which a transparent electrode layer is formed), which becomes a fixing side, wherein the electrode plates are opposite to each other, having a predetermined gap by a spacer, and electrode wirings are disposed on each of the electrode plates in a X direction and a Y direction.

With the resistive touch screen panel, when the surface of the upper electrode plate is pressed by a user's fingers, the upper electrode plate is in contact with the lower electrode plate to cause a potential gradient between the electrode layers, such that the voltage is extracted to the outside to calculate X-axis and Y-axis coordinates through a controller. Therefore, a pressed point is specified.

When being viewed from the top, the touch screen panel is divided into an active region in which the transparent electrode layers made of indium tin oxide (ITO), tin oxide ($SnO_2$), and indium oxide ($In_2O_3$) and having a uniform thickness are formed and an inactive region in which electrode wirings, conducted with the transparent electrode layers, to made of a metal material through which light does not transmit, and printed in X and Y directions, are positioned.

With the display apparatus having a touch screen panel according to the prior art, the touch screen panel is positioned on a display unit and the touch screen panel having a structure in which the active region and the inactive region are positioned on the same plane is disposed over the display apparatus, such that a display region becomes narrower. In appearance, a separate configuration (bezel structure) to cover the inactive region is required.

In addition, the display apparatus performs functions necessary for the display apparatus by separately constituting several buttons on the side surface of a terminal case. However, in order to constitute such separate buttons, the display apparatus has a complicated configuration and a limitation in the design thereof.

SUMMARY OF THE INVENTION

The present invention has been made in an effort to provide a display apparatus having a touch screen panel of which active region is disposed over the display apparatus and inactive regions are disposed at side surfaces or on a bottom surface of the display apparatus to expand a display region of the display apparatus, thereby replacing buttons positioned at the side surfaces or on the bottom surface of the display apparatus.

A display apparatus having a touch screen panel according to the present invention includes: a housing of which first surface is open; a main circuit substrate that is built-in the housing; a display unit that is connected to the main circuit substrate and is disposed to face the opened first surface of the housing; and a touch screen panel that is connected to the main circuit substrate and is positioned on the upper portion of the display unit and includes an active region disposed on the first surface and inactive regions that are extended from the active region and are disposed at side surfaces of the housing or on a second surface opposite to the first surface.

Further, the inactive regions are disposed at the inner sides of the side surfaces.

Further, the housing further includes first guide slits formed at the side surfaces or on the second surface, the active region is extended from the first surface to the outer surfaces of the side surfaces, and the inactive regions are inserted into the first guide slits.

Further, the active region is extended from the outer surfaces of the side surfaces of the housing to the outer surface of the second surface, and the inactive regions are inserted into the first guide slits formed on the second surface.

Further, the housing further includes second guide slits formed at the side surfaces or on the second surface, the touch screen panel further includes a connection unit that is extended and projected from the inactive region, the active region is extended from the first surface to the outer surfaces of the side surfaces, and the connection unit is inserted into the second guide slits.

Further, the active region is extended from the outer surfaces of the side surfaces to the outer surface of the second surface, and the connection unit is inserted into the second guide slits formed on the second surface.

Further, the housing further includes second guide slits formed at the side surfaces or on the second surface, the active region is extended from the first surface to the outer surfaces of the side surfaces, the touch screen panel further includes a FPCB connected to the connection unit formed in the inactive regions, the FPCB being inserted into the second guide slits.

Further, the active region is extended from the outer surfaces of the side surfaces to the outer surface of the second surface, and the FPCB is inserted into the second guide slits formed on the second surface.

DESCRIPTION OF THE PREFERRED EMBODIMENTS

Figure 1:
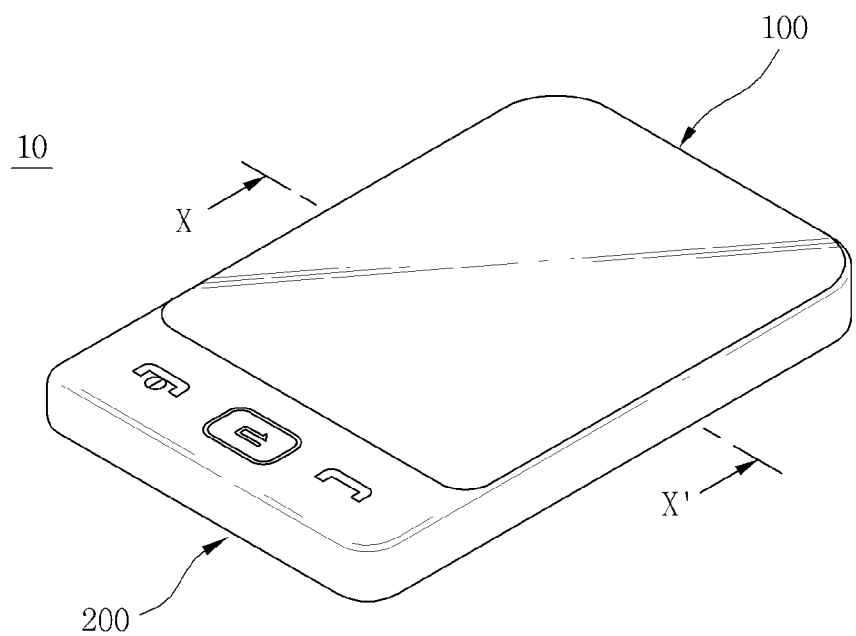
FIG. 1 is a perspective view showing a display apparatus having a touch screen panel according to a preferred embodiment of the present invention.

Various features and advantages of the present invention will be more obvious from the following description with reference to the accompanying drawings.

Terms or words used in the specification and claims herein should be not construed as a general and lexical meaning and should be construed as the meaning and concept meeting the technical idea of the present invention based on a principle that the present inventors can properly define the concepts of terms in order to elucidate their own invention in the best method.

Various objects, advantages and features of the invention will become apparent from the following description of embodiments with reference to the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 2:
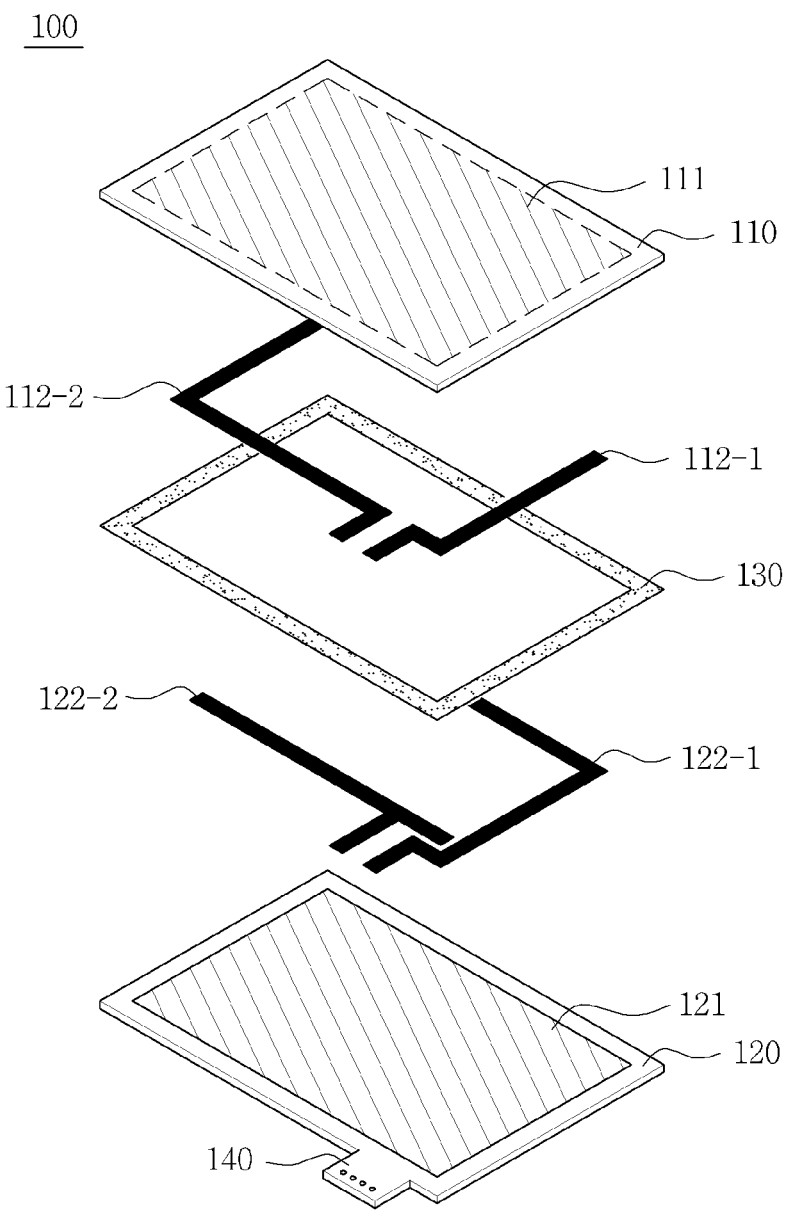
FIG. 2 is an exploded perspective view of a touch screen panel that can be used in the display apparatus having a touch screen panel of FIG. 1.
Figure 3:
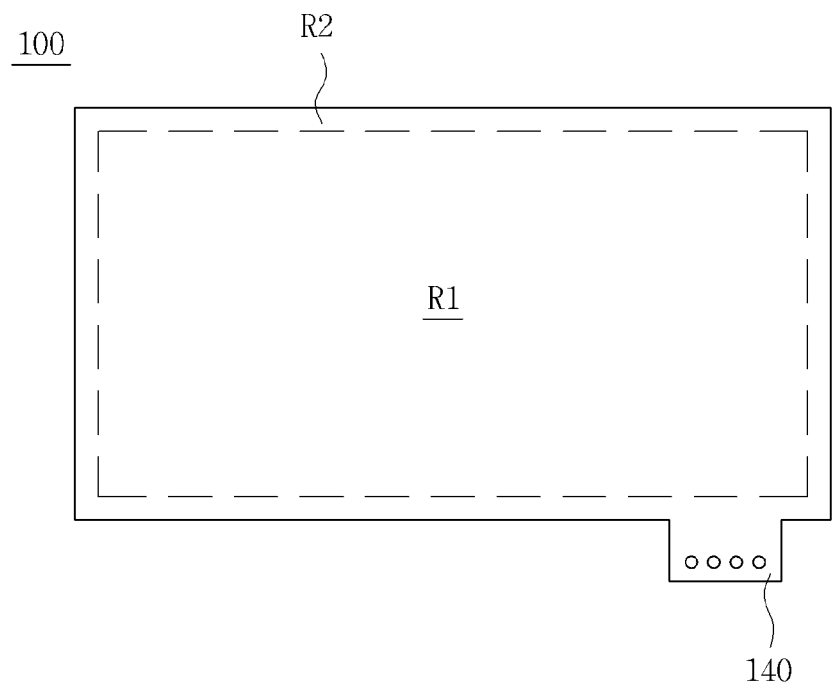
FIG. 3 is a plan view of the touch screen panel of FIG. 2.
Figure 4:
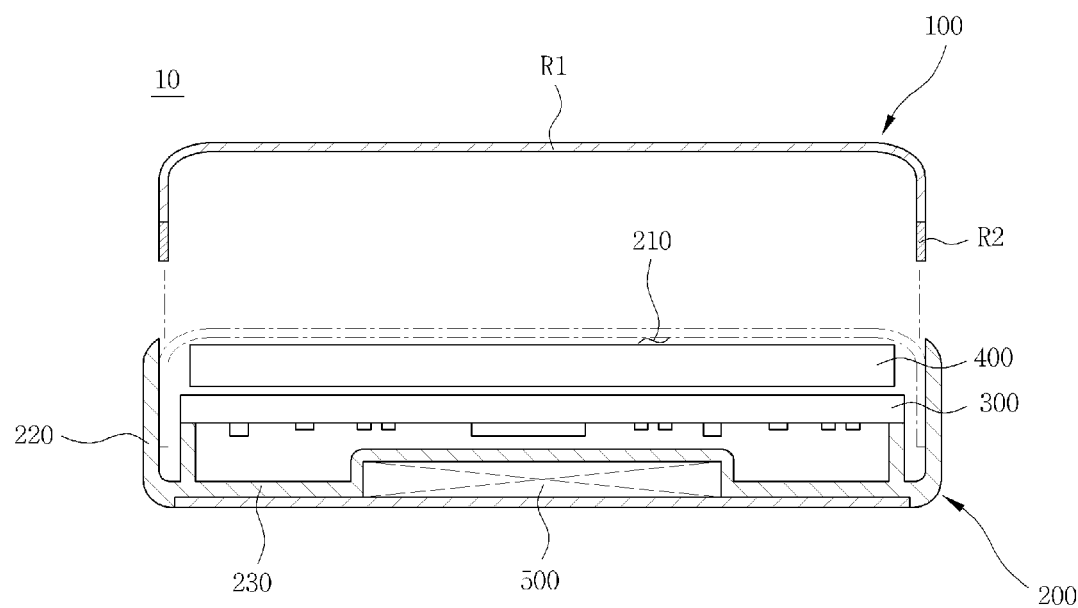
FIG. 4 is a cross-sectional view taken along line X-X' of the display apparatus having a touch screen panel of FIG. 1.

FIG. 1 is a perspective view showing a display apparatus having a touch screen panel according to a preferred embodiment of the present invention, FIG. 2 is an exploded perspective view of a touch screen panel that can be used in the display apparatus having a touch screen panel of FIG. 1, FIG. 3 is a plan view of the touch screen panel of FIG. 2, and FIG. 4 is a cross-sectional view taken along line X-X' of the display apparatus having a touch screen panel of FIG. 1.

Hereinafter, a display apparatus having a touch screen panel (hereinafter, referred to as 'display apparatus') according to the present embodiment will be described with reference to these drawings.

As shown in FIG. 1, in a display apparatus 10 according to the present embodiment, a touch screen panel 100 is disposed in a display region on which an image is displayed to a user and a bezel structure is omitted from the entire surface of the display apparatus 10. The reason is that when the touch screen panel 100 is disposed on a housing 200 of the display apparatus 10 according to the present embodiment, the inactive region in which the electrode wirings are formed is not positioned on the same plane (a display region) as the active region.

Therefore, the display apparatus 10 according to the present embodiment widens the display region on which an image is displayed to a user. Further, the bezel structure included in the display apparatus according to the prior art is not required, such that a manufacturing process is simplified.

The effects of display apparatus according to the present embodiment described above are related to the structures and shapes of the touch screen panel 100 and the housing 200. The effects will be described in detail with reference to FIG. 3. Although a cellular phone is shown in FIG. 1 as an example of the display apparatus 10, it is shown by way of example only and therefore, optional apparatuses capable of displaying an image to a user, such as a PDA, a navigation, and a computer monitor, may be used as the display apparatus 10.

FIG. 2 is an exploded perspective view of a touch screen panel that can be used in the display apparatus having a touch screen panel of FIG. 1, and FIG. 3 is a plan view of the touch screen panel of FIG. 2. FIGS. 2 and 3 only describe the configuration of a touch screen panel that can be used in the present invention. The structure and shape of the touch screen panel that is used in the present invention will be described, together with the structure of the housing of the display apparatus as shown in FIG. 4.

FIGS. 2 and 3 show an analog resistive touch screen panel 100. As shown in FIGS. 2 and 3, the analog resistive touch screen panel 100 basically includes an upper substrate 110 and a lower substrate 120 installed opposite thereto.

An upper transparent electrode layer 111 made of indium tin oxide (ITO), tin oxide ($SnO_2$), indium oxide ($In_2O_3$), a conductive polymer film, or the like and having a uniform thickness is patterned on the bottom surface (a surface opposite to the lower substrate 120) of the upper substrate 110. Also, upper electrode wirings 112-1 and 112-2 made of metal (for example, silver or copper) so as to be conducted with the upper transparent electrode layer 111 are printed in a X direction.

Similarly, the lower transparent electrode layer 121 is patterned on an opposite surface of the lower substrate 120 separated by a spacer 130 formed of an electrical insulator and lower electrode wirings 122-1 and 122-2 made of metal so as to be conducted with the lower transparent electrode layer 121 are printed on the opposite surface thereof in a Y direction.

At this time, when being viewed from the top, a region in which the transparent electrode layers 111 and 121 are formed is called as an active region R1 and a region in which the electrode wirings 112 and 122 are formed is called as an inactive region R2. The active region R1 is made of a transparent conductive material, such that an image generated from the display unit is transferred to a user by passing through the region. In contrast, the inactive region R2 is made of metal, such that an image cannot pass through the region. Therefore, a display region is determined depending on a ratio of the active region R1 and the inactive region R2 disposed over the display apparatus 10.

In particular, among the inactive region R2, a region in which the distal ends of the upper electrode wirings 112-1 and 112-2 and the lower electrode wirings 122-1 and 122-2 are disposed to be collected at the optional edges of the upper substrate 110 and the lower substrate 120 is called as a connection unit 140. The connection unit 140 may be connected to a main circuit substrate through a connection structure such as a FPCB. As shown in FIGS. 2 and 3, the connection unit 140 may be extended and projected from the inactive region R2.

Meanwhile, although 4-wire resistive touch screen panel is shown in FIG. 2, a digital resistive touch screen panel and a capacitive touch screen panel can also be used in the present embodiment.

The digital resistive touch screen panel has a shape in which a plurality of transparent resistive layers are patterned but separately. For example, a plurality of bar-shaped resistive layers may be arranged. Therefore, more electrode wirings are required and the inactive region is further expanded. In the capacitive touch screen panel, a plurality of X and Y transparent electrode patterns are also formed, such that an increasing number of to electrode wirings are required and the inactive region is also expanded.

FIG. 4 is a cross-sectional view taken along line X-X' of the display apparatus of FIG. 1. Hereinafter, the display apparatus according to a preferred embodiment of the present invention will be described with reference to FIG. 4.

As shown in FIG. 4, the display apparatus 10 includes a housing 200 of which one surface is open, a main circuit substrate 300 mounted on the inside of the housing, a display unit 400, and a touch screen panel 100 mounted on the one opened surface of the housing 200.

The housing 200 serves to protect electronic components mounted therein and has a shape in which one surface thereof is open. The housing 200 may be formed in one body or be formed by coupling several frames. At this time, the touch screen panel 100 to be described below is positioned on the one opened surface 210 (a first surface), thereby forming a closed space together with the housing 200.

The housing 200 may be formed by injecting synthetic resins or made of a metal material, for example, stainless steel (STS), titanium (Ti), or the like.

Meanwhile, in addition to the electronic components shown in FIG. 4, the housing may further include a camera unit, a mike unit, and the like.

The touch screen panel 100 is positioned on the upper portion of the display unit 400 and is disposed on the opened first surface 210 and at side surfaces 220.

At this time, the active region R1 of the touch screen panel 100 is disposed on the first surface 210 and the inactive regions R2 thereof are disposed at the side surfaces 220 of the housing 200 or on a second surface 230 (a bottom surface of the housing) opposite to the first surface 210.

In other words, the active region R1 is in parallel to the bottom surface 230 of the housing and the inactive regions R2 are extended and bent from the active region R1 to be disposed at the side surfaces 220 or on the bottom surface 230 of the housing. When the inactive regions R2 are positioned at the side surfaces 220 of the housing, the touch screen panel 100 is bent one time and when the inactive regions R2 are positioned on the bottom surface 230, the touch screen panel 100 is bent two times.

As shown in FIG. 4, the active region R1 of the touch screen panel 100 may be disposed on the opened first surface 210 and the inactive regions R2 extended from the active region R1 may be disposed at the inner sides of the side surfaces 220 of the housing. As a result, a display region may be provided over the display apparatus 10 and a bezel structure may be omitted. In FIG. 4, the active region R1 is bent, such that all of the active region R1 and the inactive regions R2 are disposed at the inner sides of the side surfaces 220 of the housing. However, only the inactive regions R2 may also be positioned at the inner sides of the side surfaces 220 of the housing.

Meanwhile, the inactive regions R2 are generally formed at four edges of the touch screen panel 100. However, as shown in FIG. 1 and FIG. 4, it is preferable that only the active region R1 is disposed on the opened first surface of the housing 200 and all of the inactive regions R2 are disposed at the inner sides of the side surfaces 220 of the housing. Further, only the inactive regions R2 formed at three edges or two edges opposite to each other may be disposed at the inner sides of the side surface 220.

In the display apparatus according to the prior art, all of the inactive regions formed at four edges are positioned on the same plane as the active region, such that the display region is reduced. In contrast, in the display apparatus according to the present invention, the inactive regions are not positioned on the same plane as the active region, such that the display region is expanded.

The main circuit substrate 300 is built-in the housing 200 to be connected to a power supplier 500 and is mounted with various electronic components such as a broadcasting receiving module, a mobile communication module, a wireless internet module, a microprocessor, and the like, which control the display unit 400 and the touch screen panel 100.

The display unit 400 is built-in so as to face the opened first surface of the housing 200, thereby displaying an image to a user. The display unit 400 may use various display elements such as a LCD, an OLED, or the like.

Figure 5:
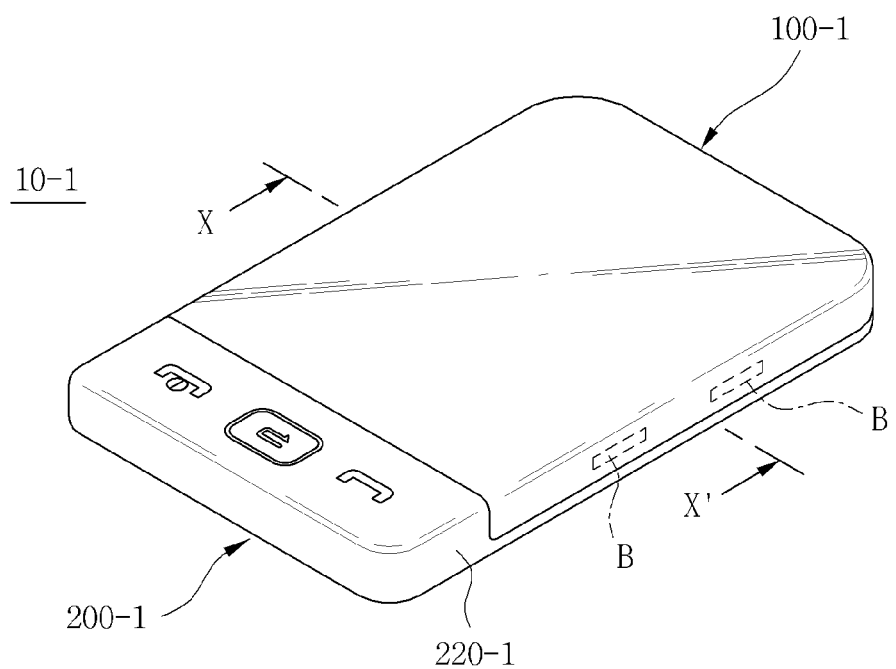
FIG. 5 is a perspective view showing a display apparatus having a touch screen panel according to a preferred another embodiment of the present invention.
Figure 6:
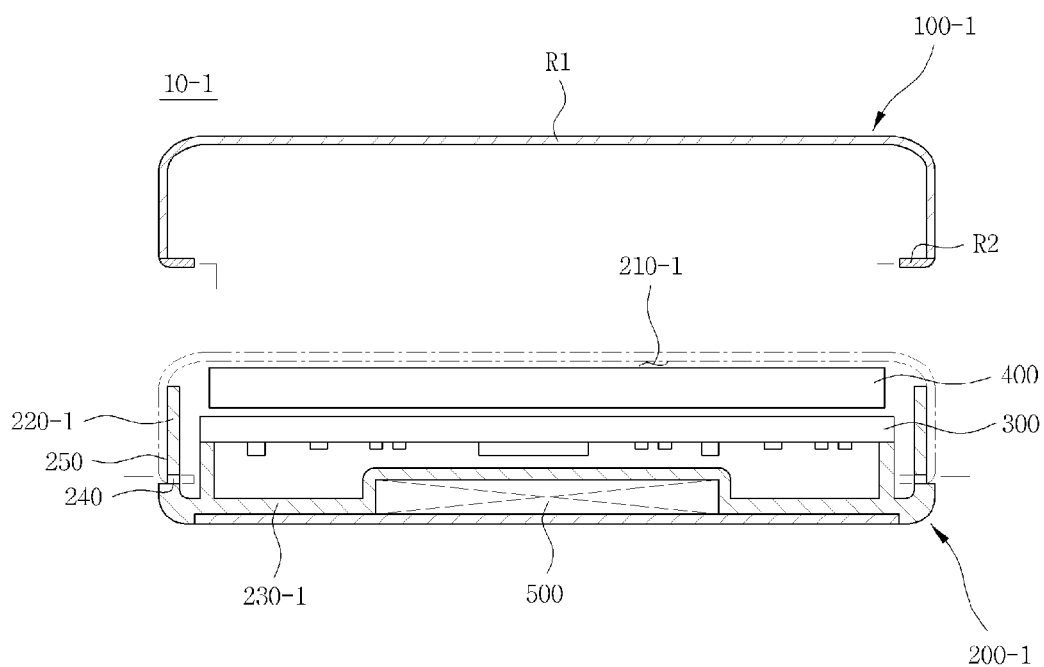
FIG. 6 is a cross-sectional view taken along line X-X' of the display apparatus having a touch screen panel of FIG. 5.
Figure 7:
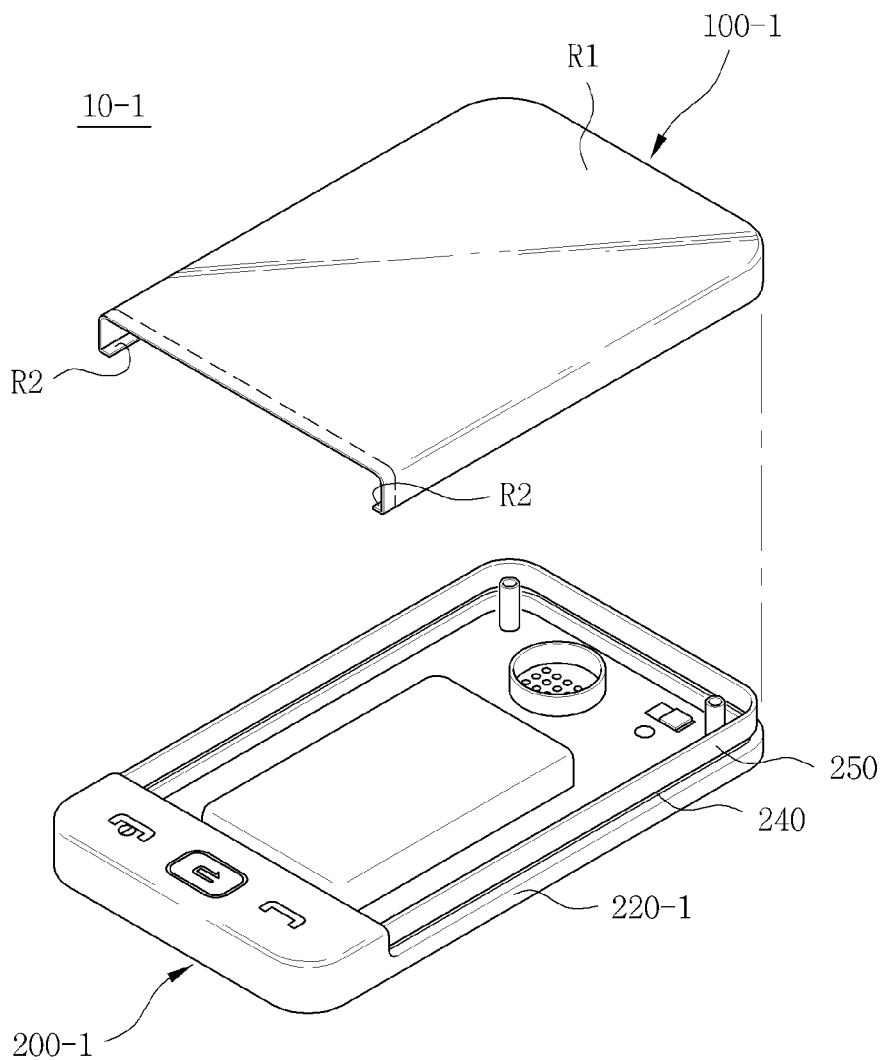
FIG. 7 is an exploded perspective view of the display apparatus having a touch screen panel of FIG. 5.

FIG. 5 is a perspective view showing a display apparatus having a touch screen panel according to a preferred another embodiment of the present invention, FIG. 6 is a cross-sectional view taken along line X-X' of the display apparatus having a touch screen panel of FIG. 5, and FIG. 7 is an exploded perspective view of the display apparatus having a touch screen panel of FIG. 5. Hereinafter, a display apparatus having a touch screen panel (hereinafter, referred to as 'display apparatus') according to the present embodiment will be described with reference to these drawings. A detailed description of the same configuration as that described with reference to FIGS. 1 to 4 will be omitted.

As shown in FIG. 5, in the display apparatus 10-1 according to the present embodiment, an active region R1 of a touch screen panel 100-1 is extended to the outer surfaces of the side surfaces 220-1 of a housing 200-1 and inactive regions R2 are inserted into guide slits formed on the housing 200-1.

A recently manufactured display apparatus mounts separate buttons (for example, a volume button) at side surfaces of the display apparatus in order to save space. However, constituting separate buttons, the display apparatus has a complicated configuration and a limitation in the design thereof.

Therefore, the display apparatus according to the present embodiment extends the active region R1 to the outer surfaces of the side surfaces 220-1, thereby making it possible to use predetermined regions as a plurality of button regions B.

The structures and shapes of the touch screen panel 100-1 and the housing 200-1 according to the present embodiment will be described with reference to FIGS. 6 and 7.

The housing 200-1 further includes first guide slits 240 formed on side surfaces 220-1, the active region R1 of the touch screen panel 100-1 is disposed on an opened first surface 210-1 of the housing and up to the outer surfaces of the side surfaces 220-1 extended from the first surface, and the inactive regions R2 of the touch screen panel 100-1 are inserted into the first guide slits 240.

At this time, the first guide slits 240 may be formed at three side surfaces of the housing 200-1 as shown in FIG. 7, and, alternatively, be formed at two side surfaces or at four side surfaces opposite to each other. This is determined depending on the shape of the touch screen panel 100-1.

When the touch screen panel 100-1 is coupled with the outer surfaces of the side surfaces 220-1 of the housing 200-1, it is preferable that the housing 200-1 has a step shape 250 (a step part) so that the touch screen panel 100-1 is not projected to the outside but forms a flat outer surface with the housing 200-1.

The active region R1 of the touch screen panel 100-1 is not only disposed on the first surface 210-1 but also disposed on the outer surfaces of the side surfaces 220-1 by being extended and bent therefrom. The regions disposed at the outer surfaces of the housing side surfaces 220-1 are used as button regions B. At this time, the touch screen panel 100-1 is bonded to the side surfaces 220-1 of the housing to be coupled with the housing 200-1.

The inactive regions R2 of the touch screen 100-1, extended from the active region R1 disposed at the outer surfaces of the side surfaces 220-1 of the housing and bent one more time, are inserted into the first guide slits 240 formed at the side surfaces 220-1 of the housing. Therefore, the inactive regions R2 are not disposed at the side surfaces 220-1 of the housing, such that a bezel structure is not required. Also, connection units 140 formed on the inactive regions R2 are inserted into the housing 200-1, such that the main circuit substrate can be easily connected to the touch screen panel 100-1.

Figure 8:
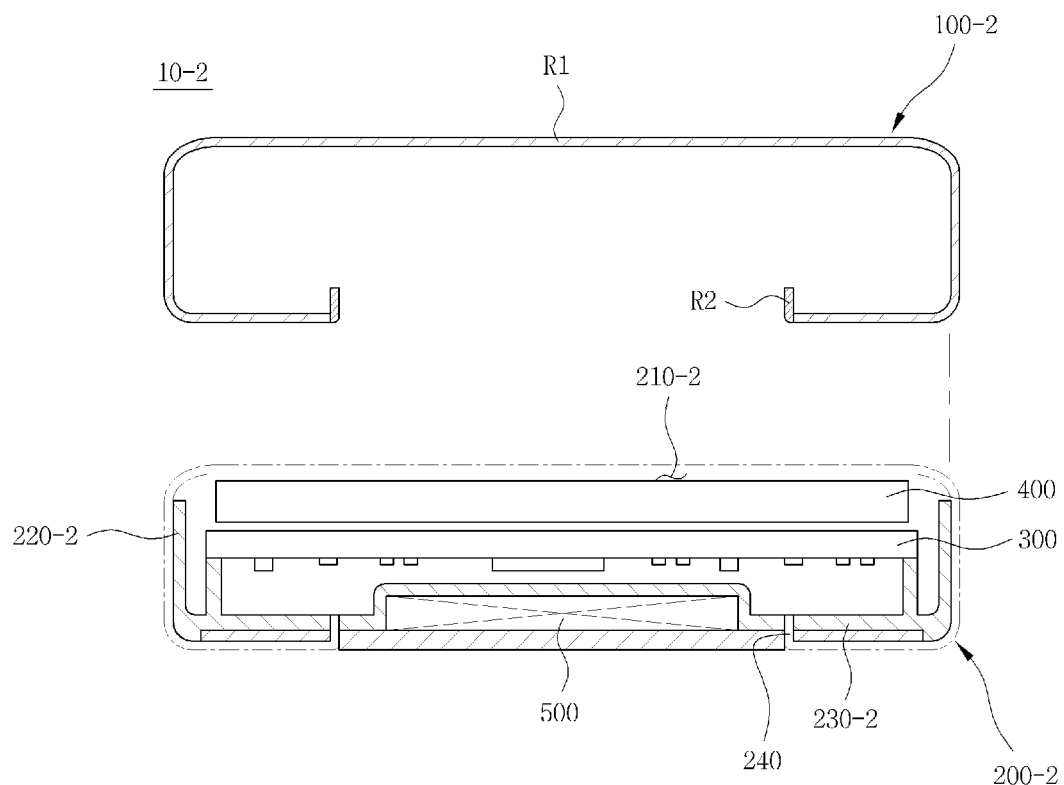
FIG. 8 is a cross-sectional view showing a modified example of the display apparatus having a touch screen panel of FIG. 5.

FIG. 8 is a cross-sectional view showing a modified example of the display apparatus having a touch screen panel of FIG. 5.

In the display apparatus 10-2 according to the present embodiment, an active region R1 of a touch screen 100-2 is extended from the outer surfaces of the side surfaces 220-2 of a housing to the outer surfaces of bottom surfaces 230-2 (second surfaces) of the housing, and inactive regions R2 are inserted into first guide slits 240 formed on the second surfaces 230-2.

In the display apparatus 10-2 according to the present embodiment, the area of the active region R1 formed at the side surfaces increases, thereby increasing freedom in the design, and the bonded surface bonded to the housing 200-2 increases, thereby increasing adhesion between the touch screen panel 100-2 and the housing 200-2.

In addition, button regions B may also be formed on the bottom surfaces 230-2 (second surfaces) of the housing, without increasing a separate configuration. For example, assuming that the display apparatus is a cellular phone, recently, the cellular phone with a camera mounted on the rear surface of the cellular phone operates by using operation buttons formed on the front surface thereof. However, in the case of the cellular phone functioning as a self-camera, a focus of the camera shakes when pressing the operation buttons formed on the front surface. When the display apparatus 10-2 according to the present embodiment is used in the cellular phone, the button regions can also be formed on the rear surface of the cellular phone without a separate configuration. In other words, the display apparatus 10-2 according to the present embodiment has the increased active region R1 of the touch screen panel 100-2, thereby making it possible to increase freedom in the design of the display apparatus 10-2.

Figure 9:
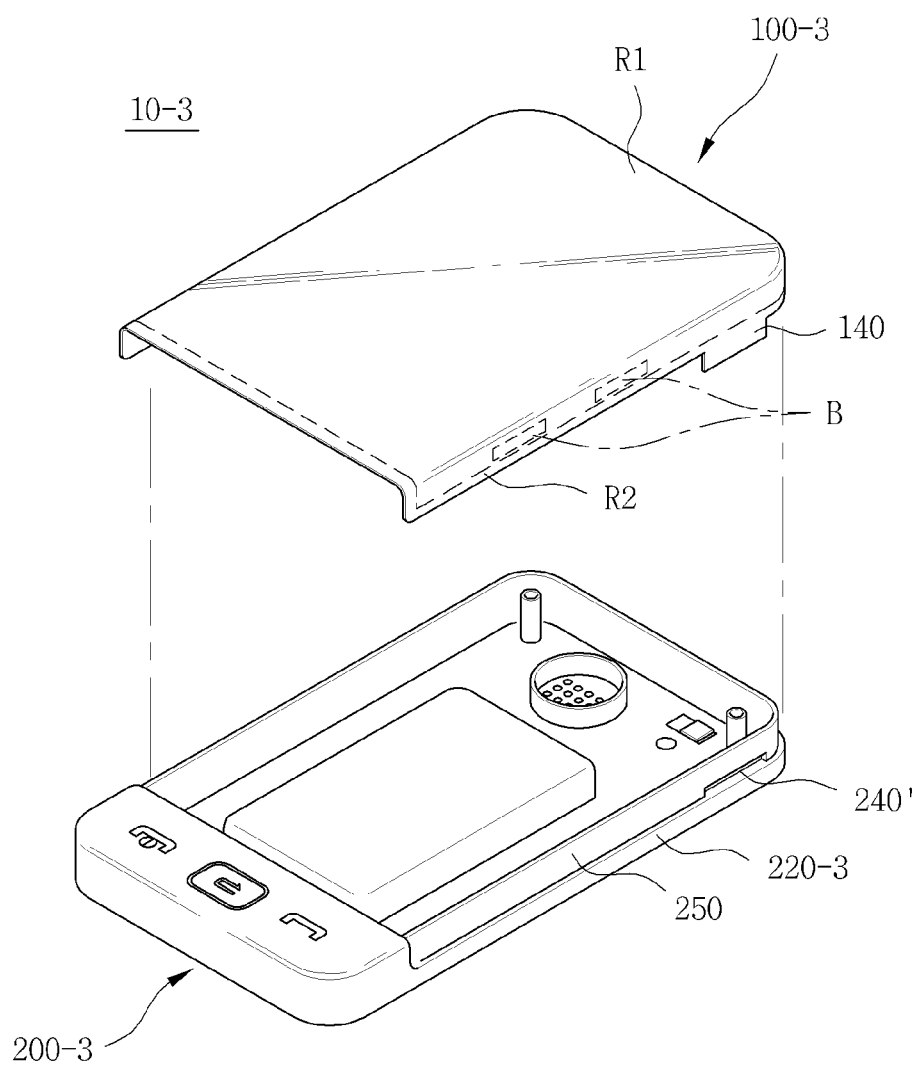
FIG. 9 is an exploded perspective view of a display apparatus having a touch screen panel according to still another embodiment of the present invention.

FIG. 9 is an exploded perspective view of a display apparatus having a touch screen panel according to still another embodiment of the present invention.

The display apparatus 10-3 according to the present embodiment further includes second guide slits 240' that are formed at side surfaces 220-3 of a housing 200-3 or on a bottom surface 230-3 (a second surface) of the housing. The second guide slits 240' may be formed at any one of the side surfaces 220-3 of the housing or on the bottom surfaces of the housing, wherein the second guide slit 240' has a length much shorter than the first guide slit 240. The length of the second guide slit 240' corresponds to the width of a connection unit 140 to be described below.

The touch screen panel 100-3 further includes a connection unit 140 that is extended and projected from inactive regions R2. The connection unit 140, which is a region in which the distal ends of the upper electrode wirings and the lower electrode wirings of the touch screen panel 100-3 are collected, is formed at an optional point of the inactive region R2. In the present embodiment, the connection unit 140 is projected and bent from the inactive region R2 to be inserted into the second guide slit 240'. The connection unit 140 inserted into the housing 200-3 is connected to a main circuit substrate through a FPCB (not shown).

When connecting the touch screen panel 100-3 disposed on the outer surface of the housing 200-3 to the main circuit substrate mounted therein, the display apparatus 10-3 can reduce the size of the guide slit, thereby making it possible to make the display apparatus 10-3 firm and to minimize the introduction of foreign material thereinto.

In the display apparatus 10-3, the second guide slit 240' may also be formed on the bottom surface (second surface) of the housing and the touch screen panel 100-3 may also be deformed as shown in FIG. 7.

Figure 10:
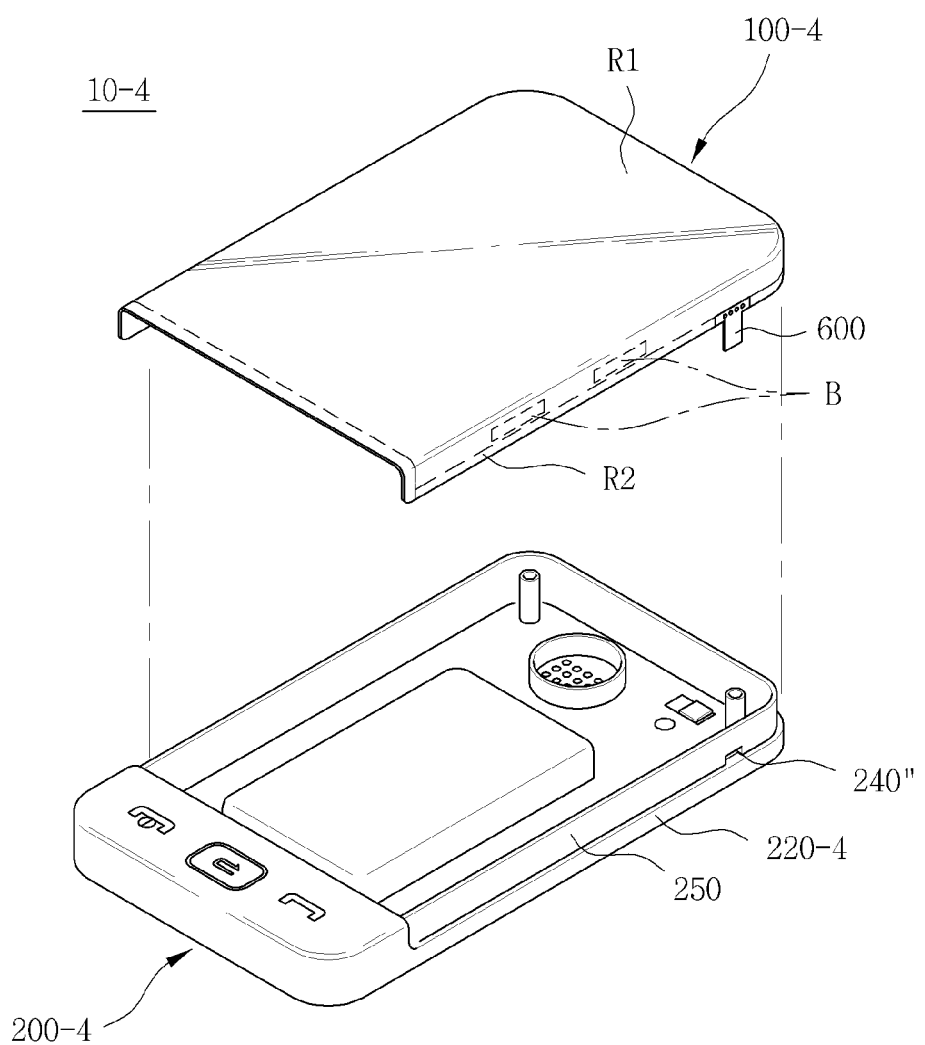
FIG. 10 is an exploded perspective view of a display apparatus having a touch screen panel according to still another embodiment of the present invention.

FIG. 10 is an exploded perspective view of a display apparatus having a touch screen panel according to still another embodiment of the present invention.

A housing 200-4 of the display apparatus 10-4 according to the present embodiment further includes a second guide slit 240" that is formed at side surfaces 220-4 or on a bottom surface (a second surface) and an active region R1 of the touch screen panel 100-4 is extended from an opened first surface to the outer surfaces of side surfaces 220-4 or to a bottom surface (a second surface).

At this time, the touch screen panel 100-4 is connected to a main circuit substrate 300 through a FPCB 600, wherein one end of the FPCB 600 is connected to a connection unit formed in the inactive region R2, the FPCB 600 is inserted into the second guide slit 240", and the other end of the FPCB 600 is connected to the main circuit substrate.

The display apparatus 10-4 may have a length or a width shorter than that of the second guide slit 240' described with reference to FIG. 9 and the FPCB 600, which is flexible, can be easily inserted into the second guide slit 240".

With the display apparatus having a touch screen according to the present invention, the active region of the touch screen panel is disposed over the display apparatus, thereby making it possible to expand the display region of the display apparatus and to minimize the bezel structure included in the display apparatus according to the prior art.

In addition, the inactive region of the touch screen panel is disposed at the side surfaces or on the rear surface of the display apparatus, such that buttons positioned at the side surfaces or on the rear surface of the display apparatus can be omitted, thereby making it possible to simplify the configuration of the display apparatus and to improve freedom in the design thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A display apparatus having a touch screen panel, comprising:
   a housing of which first surface is open;
   a main circuit substrate that is built-in the housing;
   a display unit that is connected to the main circuit substrate and is disposed to face the opened first surface of the housing; and
   a touch screen panel that is connected to the main circuit substrate and is positioned on the upper portion of the display unit and includes an active region disposed on the first surface and inactive regions that are extended and bent from the active region and are disposed at outer surfaces of side surfaces of the housing or on a second surface opposite to the first surface,
   wherein the housing further includes guide slits formed at the outer surfaces of the side surfaces or on the second surface, and, the active region is extended from the first surface to the outer surfaces of the side surfaces, and the inactive regions are inserted into the guide slits.

2. The display apparatus having a touch screen panel as set forth in claim 1, wherein the housing further includes a step part in the outer surfaces of the side surfaces so that the touch screen panel is not projected to the outside but forms a flat outer surface with the housing.

3. The display apparatus having a touch screen panel as set forth in claim 2, wherein the active region is extended from the outer surfaces of the side surfaces of the housing to the outer surface of the second surface, and the inactive regions are inserted into the guide slits formed on the second surface.

4. A display apparatus having a touch screen panel, comprising:
   a housing of which first surface is open;
   a main circuit substrate that is built-in the housing;
   a display unit that is connected to the main circuit substrate and is disposed to face the opened first surface of the housing; and
   a touch screen panel that is connected to the main circuit substrate and is positioned on the upper portion of the display unit and includes an active region disposed on the first surface and inactive regions that are extended and bent from the active region and are disposed at outer surfaces of side surfaces of the housing,
   wherein the housing further includes a step part in the outer surfaces of the side surfaces so that the touch screen panel is not projected to the outside but forms a flat outer surface with the housing, and guide slits formed at the side surfaces, the touch screen panel further includes a connection unit that is extended and projected from the inactive region, the active region is extended from the first surface to the outer surfaces of the side surfaces, and the connection unit is inserted into the guide slits.

5. The display apparatus having a touch screen panel as set forth in claim 4, wherein the active region is extended from the outer surfaces of the side surfaces to the outer surface of the second surface, and the connection unit is inserted into the guide slits formed on the second surface.

6. The display apparatus having a touch screen panel as set forth in claim 4, wherein the housing further includes second guide slits formed at the side surfaces or on the second surface, the active region is extended from the first surface to the outer surfaces of the side surfaces, the touch screen panel further includes a FPCB connected to the connection unit formed in the inactive regions, the FPCB being inserted into the guide slits.

7. The display apparatus having a touch screen panel as set forth in claim 6, wherein the active region is extended from the outer surfaces of the side surfaces to the outer surface of the second surface, and the FPCB is inserted into the guide slits formed on the second surface.

* * * * *